United States Patent
Harrison et al.

(10) Patent No.: US 9,465,494 B2
(45) Date of Patent: Oct. 11, 2016

(54) METHOD AND APPARATUS FOR CLASSIFYING TOUCH EVENTS ON A TOUCH SENSITIVE SURFACE

(71) Applicant: Carnegie Mellon University, Pittsburgh, PA (US)

(72) Inventors: Christopher Harrison, Pittsburgh, PA (US); Julia Schwarz, Pittsburgh, PA (US); Scott E. Hudson, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/242,127

(22) Filed: Apr. 1, 2014

(65) Prior Publication Data
US 2014/0210788 A1    Jul. 31, 2014

Related U.S. Application Data

(63) Continuation of application No. PCT/US2012/060865, filed on Oct. 18, 2012.

(60) Provisional application No. 61/627,831, filed on Oct. 18, 2011.

(51) Int. Cl.
G06F 3/044      (2006.01)
G06F 3/041      (2006.01)
G06F 3/043      (2006.01)

(52) U.S. Cl.
CPC .............. *G06F 3/044* (2013.01); *G06F 3/043* (2013.01); *G06F 3/0416* (2013.01); *G06F 3/0433* (2013.01); *G06F 2200/1636* (2013.01); *G06F 2203/04106* (2013.01)

(58) Field of Classification Search
CPC .... G06F 3/044; G06F 3/0433; G06F 3/0416; G06F 2203/04106; G06F 3/043; G06F 2200/1636

USPC .................................................. 345/173, 174
See application file for complete search history.

(56) References Cited

U.S. PATENT DOCUMENTS 8,269,744 B2 *   9/2012   Agari ...................... G06F 3/044
                                                  345/173
8,743,091 B2 *   6/2014   Bernstein ...................... 345/177
(Continued)

FOREIGN PATENT DOCUMENTS

JP        2004-213312 A        7/2004
KR   10-2002-0075283 A    *  10/2002
WO       2006-070044 A1        7/2006

OTHER PUBLICATIONS

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

(Continued)

*Primary Examiner* — Aneeta Yodichkas
*Assistant Examiner* — Chineyere Wills-Burns
(74) *Attorney, Agent, or Firm* — Jones Day

(57) ABSTRACT

An apparatus classifies touch events. The apparatus includes a touch sensitive surface configured to generate a touch event when an object touches the touch sensitive surface. The touch event entails a mechanical vibration upon contact with the surface. The apparatus includes a touch event detector configured to detect the onset of a touch, and a touch event classifier configured to classify the touch event to identify the object used for the touch event. The mechanical vibration is created via any one of finger parts including a tip, a pad, a fingernail, and a knuckle, each of which has a unique feature different from each other.

20 Claims, 6 Drawing Sheets

(56) References Cited

U.S. PATENT DOCUMENTS

| | | | | |
|---|---|---|---|---|
| 2005/0083313 | A1* | 4/2005 | Hardie-Bick | 345/177 |
| 2005/0146512 | A1* | 7/2005 | Hill | G06F 3/0436 345/173 |
| 2007/0109279 | A1* | 5/2007 | Sigona | G06F 3/0418 345/177 |
| 2010/0265185 | A1* | 10/2010 | Oksanen | G06F 3/0488 345/173 |
| 2011/0007000 | A1* | 1/2011 | Lim | A63F 13/10 345/173 |
| 2011/0018825 | A1* | 1/2011 | Kondo | G06F 3/0433 345/173 |
| 2013/0091123 | A1* | 4/2013 | Chen | G06F 3/00 707/722 |
| 2013/0187883 | A1* | 7/2013 | Lim | G06F 3/03547 345/173 |

OTHER PUBLICATIONS

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery, 2; pp. 121-167; 1998.

Cao, Xiang, Wilson, Andrew, Balakrishnan, Ravin, Hinckley, Ken, Hudson, Scott; ShapeTouch: Leveraging Contact Shape on Interactive Surfaces; IEEE International Workshop on Horizontal Interactive Human Computer System (Tabletop); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz, Paul, Harsham, Bret, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Dietz, Paul, Leigh, Darren; DiamondTouch: A Multi-User Touch Technology; ACM Symposium on User Interface Software & Technology (UIST); pp. 219-226; 2001.

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Harrison, Chris, Tan, Desney, Morris, Dan; Skinput: Appropriating the Body as an Input Surface; Proceedings of CHI, 2010; pp. 453-462; 2010.

Harrison, Chris, Hudson, Scott; Scratch Input: Creating Large, Inexpensive, Unpowered and Mobile Finger Input Surfaces; Proceedings of UIST, 2008; pp. 205-208; 2008.

Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch = New Tools; Proceedings of UIST, 2010; pp. 27-36; 2010.

Hinckley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; The Generalized Perceived Input Point Model and How to Double Touch Accuracy by Extracting Fingerprints; Proceedings of CHI, 2010; pp. 581-590; 2010.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Designing a Finger, Hand, Body, and Object Sensitive Wall; Proceedings of UIST, 1997; pp. 209-210; 1997.

Mimio; http://www.mimio.com.

Olwal, Alex, Wilson, Andrew; SurfaceFusion: Unobtrusive Tracking of Everyday Objects in Tangible User Interfaces; Proceedings of GI, 2008; pp. 235-242; 2008.

Paradiso, Joseph, Leo, Che King; Tracking and Characterizing Knocks Atop Large Interactive Displays; Sensor Review, 25(2); pp. 134-143; 2005.

Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.

Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.

Rekimoto, Jun, Saitoh, Masanori; Augmented Surfaces: A Spatially Continuous Work Space for Hybrid Computing Environments; Proceedings of CHI, 1999; pp. 378-385; 1999.

Rekimoto, Jun, Sciammarella, Eduardo; ToolStone: Effective use of the Physical Manipulation Vocabularies of Input Devices; Proceedings of UIST, 2000; pp. 109-117; 2000.

Rekimoto, Jun; SmartSkin: An Infrastructure for Freehand Manipulation on Interactive Surfaces; Proceedings of CHI, 2002; pp. 113-120; 2002.

Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.

Wang, Feng, Ren, Xiangshi; Empirical Evaluation for Finger Input Properties in Multi-Touch Interaction; Proceedings of CHI, 2009; pp. 1063-1072; 2009.

International Search Report and Written Opinion for PCT/US2012/060865; mailed Mar. 29, 2013.

* cited by examiner

METHOD AND APPARATUS FOR CLASSIFYING TOUCH EVENTS ON A TOUCH SENSITIVE SURFACE

CROSS-REFERENCE TO RELATED APPLICATION

This invention was made with Government support under IIS0713509 awarded by the National Science Foundation. The Government has certain rights in this invention.

This application claims the benefit of U.S. Provisional Patent Application No. 61/627,831, filed on Oct. 18, 2011, which is hereby incorporated by reference as if fully set forth herein. This application is a continuation of PCT/US2012/060865 filed on Oct. 18, 2012, which is hereby incorporated by reference as if fully set forth herein.

TECHNICAL FIELD

The present invention relates to an enhancement to touch interaction; and more particularly, to an apparatus and method for classifying touch events on a touch sensitive surface.

BACKGROUND

Computers are increasingly featuring direct touch interfaces, found in forms as diverse as kiosks and interactive tabletops, to tablet computers and handheld mobile devices. At present, finger input on touch screens is handled very simplistically, often boiled down to an X/Y coordinate. Many technologies exist that have the ability to digitize different types of input. There are two main touch sensing approaches: active and passive. The key downside of active approaches is that an explicit object must be used (e.g., a special pen), which is implemented with electronics (and batteries if not tethered). For example, pens augmented with infrared light emitters on their tips can be used on the commercially available Microsoft Surface. There have also been efforts to move beyond pens, including, e.g., infrared-light-emitting brushes for painting applications. Current systems generally do not attempt to discriminate among different pens (just perhaps pen from finger input). Variably-modulated infrared light enables identification, but requires specialized hardware. Additionally, ultrasonics can be used for input localization, and can provide pen ID as well. Capacitive coupling in allows users or objects to be localized and identified, though this requires grounding plates or a physical connection to function.

Sensing based on electromagnetic resonance, another method, operates between active and passive. Although the tools and tangibles need not be powered, they contain a resonant coil that is excited by proximate EM fields, generated by the specialized tablet they operate on. Although highly capable, including the ability to provide ID, table-sized setups are prohibitively expensive at present. It is also possible to support object identification through a combination of RFID and vision processing, which offers greater scalability.

Fiducial markers are a truly passive approach. They provide the ID of an object through a uniquely patterned tag—often in a sticker form factor. This method has been shown to be very capable—the only major drawback is the size of the marker, which in general, prevents placement on small surfaces like the tip of a pen. Fiducial markers can also work in a capacitive-sensing manner, allowing tags to be embedded in an object. Additionally, the shape of an object can be captured optically and used for classification (e.g., mice and keyboards).

In general, the aforementioned techniques require instrumentation of the object providing input, which is problematic for fingers (i.e., people do not like to wear things on their fingers and hands). Researchers have also looked at wrist-mounted acoustic sensors that can classify finger-on-finger actions, such as pinching or flicking. Finger taps can also be localized on the body through acoustic fingerprinting. However, the latter systems require sensors to be placed on the user.

Without instrumentation, some areas of the finger can be determined through computer vision (e.g., pad vs. tip). Using accelerometers, soft and hard taps can be discriminated. Finally, time of flight analysis can be used to localize touch events on the surface of an object.

Contemporary interactive surfaces generally treat finger touches as a single class of input (a partial exception to this are finger-print scanning systems, which can capture a high-resolution fingerprint image to infer the 3D "posture" of a finger; also, area of contact via optical or capacitive sensing can be considered an extra input dimension). However, this is a gross simplification—fingers are diverse appendages, both in their motor capabilities and their anatomical composition. Supporting additional dimensions of finger input has largely been ignored because instrumenting the user with active or passive components is invasive.

SUMMARY

At present, in order for a finger to perform different operations at a single point in space, it must be overloaded, typically triggered by a tap-and-hold period or chording of the fingers (e.g., two-finger-tap for right click). This can trigger a transient contextual menu, which allows a user to select one of several actions. An alternative to finger overloading is breaking functionality out into one or more buttons. For example, there is a scheme in which a button is for minimizing a window and another for closing it. However, this is problematic for mobile devices with limited screen real estate.

In view of the above, the present invention provides an apparatus and method for classifying touch events on a touch sensitive surface.

In accordance with an aspect of the present invention, there is provided an apparatus for classifying touch events, which includes: a touch sensitive surface configured to generate a touch event when an object touches the touch sensitive surface, wherein the touch event entails a mechanical vibration upon contact with the surface; a touch event detector configured to detect the onset of a touch; and a touch event classifier configured to classify the touch event to identify the object used for the touch event.

In one exemplary embodiment, the touch event classifier includes: a conversion unit configured to convert a mechanical vibration signal into an electrical signal; an extraction unit configured to derive a series of features representative of the touch event from the electrical signal; and a classification unit configured to classify the touch input using the features to identify the object used for the touch event.

In one exemplary embodiment, the touch event detector is embedded in the apparatus to detect the touch event.

In one exemplary embodiment, the touch event detector is attached to the touch sensitive surface to detect the touch event.

In one exemplary embodiment, the mechanical vibration comprises an acoustic signal.

In one exemplary embodiment, the mechanical vibration is created via any one of finger parts including a fingertip, finger pad, a fingernail, and a knuckle or the mechanical vibration is created through the use of a passive tool impacting the touch sensitive surface.

In one exemplary embodiment, each of the finger parts is used to provide input to a touch based interface, and each of the finger parts can be bound to different user interface actions.

In accordance with another aspect of the present invention, there is provided a method for classifying touch events, which includes: detecting a touch event, wherein the touch event is made by an object touching/striking a touch sensitive surface and entails the generation of an acoustic signal due to impacting the touch sensitive surface; deriving a set of features representative of the touch event from the acoustic signal; and classifying the touch event using the features to identify the object used for the touch event.

In one exemplary embodiment, the detecting the touch event includes capturing a mechanical vibration signal.

In one exemplary embodiment, the classifying the touch event includes: converting the mechanical vibration signal into an electrical signal; extracting a series of features representative of the touch event from the electrical signal; and classifying the touch event using the features to identify the object used for the touch event.

In one exemplary embodiment, the mechanical vibration is created by any one of many parts of a finger, including a tip, a pad, a fingernail, and a knuckle or the mechanical vibration is created through the use of a passive tool impacting on the touch sensitive surface.

In one exemplary embodiment, each of the finger parts is used to provide a touch based interface, and each of the finger parts is used to input a secondary action.

BRIEF DESCRIPTION OF THE DRAWINGS

The above and other objects and features of the present invention will become apparent from the following description of embodiments given in conjunction with the accompanying drawings, in which.

DETAILED DESCRIPTION

Figure 1:
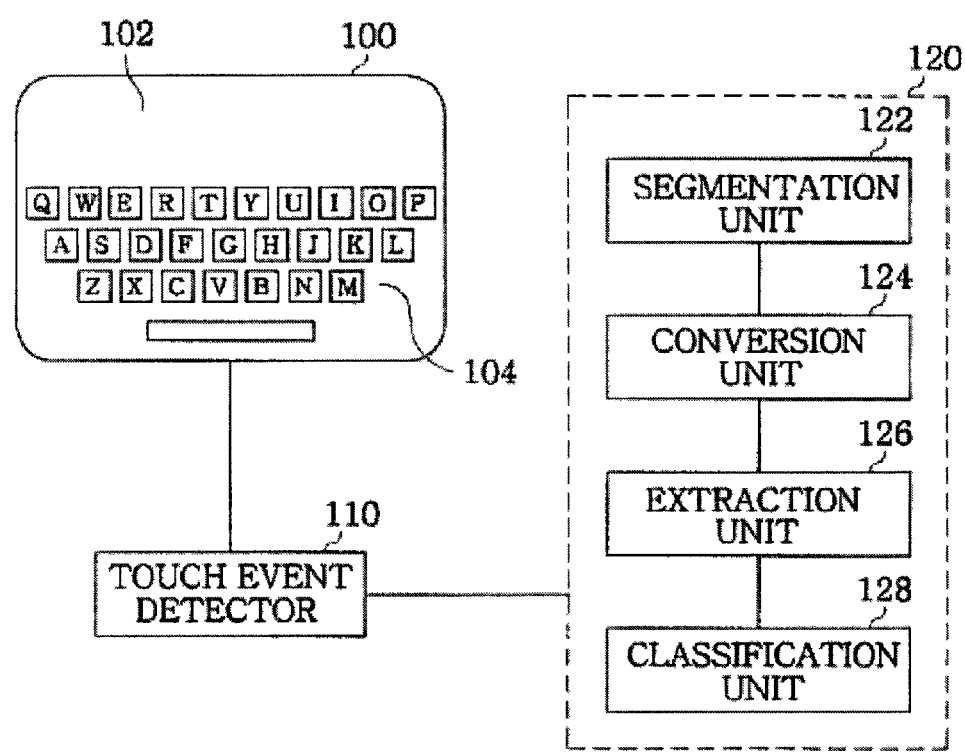
FIG. 1 is a block diagram of an apparatus for classifying touch events on a touch sensitive surface in accordance with a first embodiment of the present invention.

Hereinafter, embodiments of the present invention will be described in detail with reference to the accompanying drawings, in which like reference numerals and like components refer to like elements.

FIG. 1 illustrates a block diagram of an apparatus for classifying touch events on a touch sensitive surface in accordance with a first embodiment of the present invention.

The apparatus of the first embodiment includes a touch sensitive surface 100, a touch event detector 110, and a touch event classifier 120.

Figure 2:
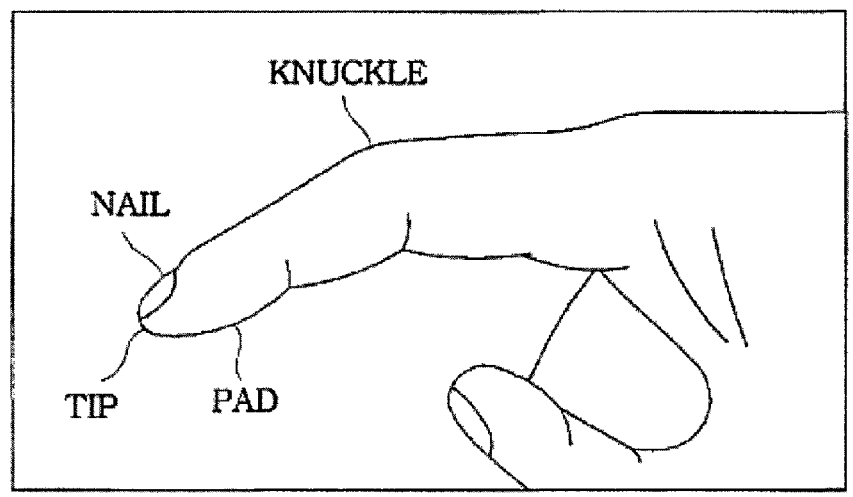
FIG. 2 illustrates different parts of a finger for producing different touch events in accordance with the embodiment of the present invention.
Figure 4:
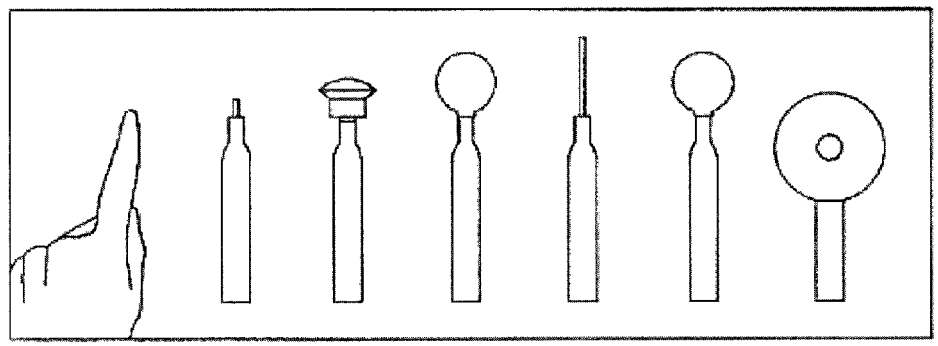
FIG. 4 shows a finger and six passive tools (i.e., objects requiring no power) with different materials affixed to their tips, such as from left to right, a polycarbonate nub, wood knob, acrylic ball, metal screw, ping-pong ball, and foam.

The touch sensitive surface 100 is an electronic visual display that can detect and track the presence and location of a touch event performed thereon, with a finger or other passive objects, such as a stylus. The touch sensitive surface 100 includes an interactive user interface 102 on which a variety of touch events are generated by a user. The touch events may include a touch event using a finger touch, touch events using different parts of a finger as illustrated in FIG. 2, and touch events using passive tools as illustrated in FIG. 4. A variety of technologies may be used, including optical, resistive, and capacitive touch screens to detect and track the presence and location of the touch event. For example, the touch sensitive surface 100 may be employed in a portable device such as a mobile phone, PDA, smart-phone and the like, but not limited thereto.

The touch sensitive surface 100 may provide a user interface, for example, a virtual soft keyboard 104 thereon. The virtual keyboard 104 has an alphabet character set on keys or buttons used to type text. To type a primary character, users may use their finger pad as usual. Such a soft keyboard on portable devices is particularly problematic—there are many keys that need to be provided on little space. In response, keyboards may be typically broken up into several "pages" of keys, toggled with modal buttons. Not only does this add extra clicks to typing interactions, but also further crowds the small screen.

The apparatus of this embodiment is aimed to alleviate some of these problems by employing touch events via objects inclusive of the finger parts or passive tools. It may feature two key sets that operate in parallel.

Fingers are diverse appendages, both in their motor capabilities and their anatomical compositions. A single digit contains different parts such as one or more knuckles, a tip, pad, and fingernail, as illustrated in FIG. 2. These finger parts may be employed to generate the touch events. Further, as shown in FIG. 4, a set of passive objects requiring no power may also be employed to generate the touch events. The passive objects may include six tools with different materials affixed to their tips, such as, from left to right, a polycarbonate nub, wood knob, acrylic ball, metal screw, ping-pong ball, and foam. These passive objects are simply different materials glued to the heads of dry erase markers.

Figure 3:
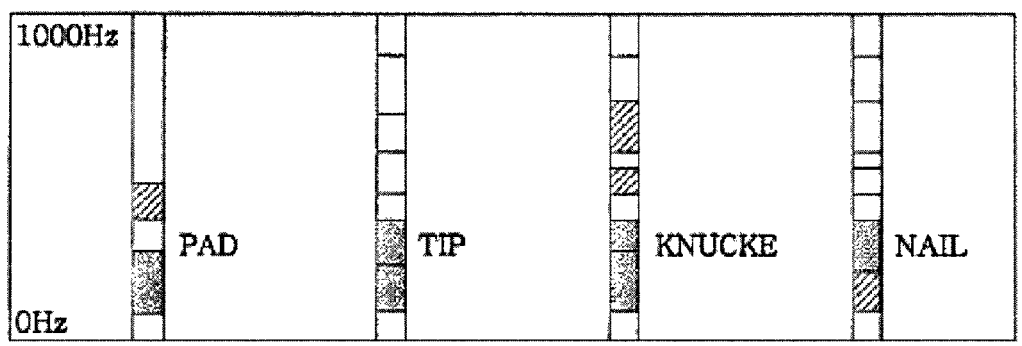
FIG. 3 shows spectrograms of four finger input types in accordance with the embodiment of the present invention.

When an object strikes a surface, an ensemble of mechanical vibrations propagate outward through the material. Typically, interactive surfaces use rigid materials, such as plastic or glass, which both quickly distribute and faithfully preserve the signal. As such, physical impact events using respective finger parts or respective passive tools cause mechanical vibrations upon contact with the touch sensitive surface 100. The mechanical vibrations entail different features for each finger part or passive tool. For example, FIG. 3 shows spectrograms of four types of the touch input. As known from FIG. 3, different parts of the finger produce different mechanical vibration (i.e., acoustic) signatures.

In accordance with one exemplary embodiment, the apparatus is designed to recognize small set of passive tools as well as discriminate different parts of the finger based on the different features. This ability to identify what object was used for the touch event is achieved by the feature classification. It relies on the physical principle that different materials produce different features and have different resonant frequencies as illustrated in FIG. 3.

In one exemplary embodiment, when a touch event of a finger is used as normal to provide a conventional touch based interface, touch events by the objects may be used to represent secondary actions to change the function or touch event of the other pressed key by the finger. For example, an "ALT" input may be achieved by a physical impact event on the touch sensitive surface 100 using a knuckle of the finger (which may correspond to "right click" on a desktop computing system), a "BACKSPACE" input may be achieved by a physical impacting event on the touch sensitive surface 100 using a fingernail, and the like. The strength of impacts does not need to be great. Indeed, a user needs to tap no harder than required to type on a keyboard. A key property of this approach is that items striking the touch sensitive surface 100 do not require active components. Input objects are simply composed of different materials and are entirely passive. Thus, users have access to the entire character set without having to switch pages.

Referring again FIG. 1, the touch event detector 110 is disposed to detect the mechanical vibration caused by the touch event using a finger part as illustrated in FIG. 2 or a passive tool as illustrated in FIG. 5.

The touch event detector 110 can be triggered by the touch sensitive surface 100 or by the onset of appropriate mechanical vibrations resulting from an object touching the screen. To capture events and the subsequent mechanical vibrations, the touch event detector 110 may include one or more impact sensors, vibration sensors, accelerometers, strain gauges, or acoustic sensors such as a condenser microphone, a piezoelectric microphone, MEMS microphone or the like.

Once a mechanical vibration signal by the touch event has been captured by the touch event detector 110, the touch event classifier 120 processes the mechanical vibration signal to classify the touch event so that an object used for the touch event can be identified.

The touch event classifier 120 includes a segmentation unit 122 configured to segment the mechanical vibration signal in a digital representation; a conversion unit 124 configured to convert the digitized vibration signal into an electrical signal; a feature extraction unit 126 configured to derive a series of features from the electrical signal; and a classification unit 128 configured to classify the touch event using the features to identify what part of the finger or passive tool was used for the touch input.

The segmentation unit 122 samples the mechanical vibration signal, for example, at a sampling rate 96 kHz, using a sliding window of 4096, which contains a 43 ms segment of the mechanical vibration signal.

The conversion unit 124 then performs, for example, a Fourier Transform on sampled time-dependent vibration signal to produce an electrical signal having frequency domain representation. For example, the Fourier Transform of this window may produce 2048 bands of frequency power. Among them, the lower 500 bands, representing acoustic (i.e., mechanical vibration) power from 0 to 10 kHz, may be selected for further processing thereof Alternatively, other frequency bands, for example, lower than 1 kHz may be chosen, which is expressive as shown in FIG. 3.

The touch event classifier 120 may further down-sample this data into an additional vectors (i.e., buckets of ten), providing a different aliasing. In addition, additional features may be calculated from the mechanical vibration signal such as the average absolute amplitude, total absolute amplitude, standard deviation of the absolute amplitude, and center of mass for both the segmented input signal and the Fourier Transformed signal.

The feature extraction unit 126 may also calculate a series of features from the frequency domain representation of the mechanical vibration, such as the fundamental frequency of the impact waveform.

The classification unit 128 classifies the touch event using the features to identify what object was used to generate the touch event.

To aid classification, the user can provide supplemental training samples to the classifier.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

Once a classification has been made, the resulting type is used to label an unassigned input point, which is digitized by one of many touch sensing technologies. This matching process may be done several ways. In one exemplary embodiment, this can be done by selecting an input event with the closest onset timestamp. The entire classification process, starting from the onset of impact, can occur in 100 ms or less, allowing for real-time interaction.

In practice, this method appears to work fairly well and enables several users with multiple input objects to work on a common surface simultaneously. However, there is one special case where this process breaks down and for which there is no immediate solution—timing collisions. In particular, if two objects strike the touch sensitive surface in sufficiently close temporal proximity, their vibration signals will not be segmented separately, and therefore not allow for accurate classification. The duration of this period is defined by four factors: 1) the aggressiveness of the segmenter (classification could potentially use, e.g., the first 10 ms of the mechanical vibration signal), 2) the resonant frequencies of the impact material (lower frequencies take longer to dissipate), 3) the dampening of the touch sensitive surface (to dissipate previous impacts), and 4) the size of the touch sensitive surface (more mass takes longer to dampen).

An alternative solution is to employ sophisticated algorithms (e.g., beam forming) that can localize impact sounds and separate them into distinct acoustic waveforms. Although this is generally applied to environmental noises, such as speech, the principles may also be applied to touch surfaces. However, this issue is mostly unnecessary for mobile devices, which, due to their small size and light weight, quickly diminish acoustic energy. Taps can occur as close as ~50 ms apart on the apparatus of the embodiment. Furthermore, mobile devices typically have a single user. This reduces the possibility of simultaneous impacts.

The embodiment of the present invention has been shown and described to an enhancement to touch interaction that allows the touch sensitive surfaces to identify the type of object being used for touch input. The embodiment may also be used in a wide variety of application domains and use contexts such as a simple painting interface as follows.

For example, to draw freehand, a user may simply use a finger pad like a brush. To draw line segments, a finger tip taps the touch sensitive surface and then drags to a desired location. To undo the last stroke, users can nail tap anywhere on the interactive touch screen. This, like the keyboard demo of the first embodiment, illustrates a simple way to remove modal buttons from the interaction and push this complexity to highly dexterous fingers. Other interactions may involve rapid switching between tools (e.g., fill tool, erase tool) and modes (e.g., brush thickness, opacity, color).

It is interesting to note that humans use different parts of their fingers in different ways—to scratch an itch, type on a keyboard, tap a co-worker on the shoulder, or knock on a door. With careful design, it may be possible to leverage these norms such that existing finger behaviors could be ported to and made relevant in digital domains.

For example, consider a system where a knuckle "knock" is used to open files or applications. A tap with the tip of the finger (i.e., poke) could be used to bring something to attention, perhaps maximized or given focus, whereas a fingernail "flick" could be used to minimize or delete an item. This functionality could operate in harmony with conventional finger-driven interfaces, which tend to rely on finger pads for pointing and "clicking".

Humans have remarkable dexterity with handheld tools and numerous research projects have introduced physical manipulators to interactive systems. These often come in the form of pens, pointing devices, stamps (e.g., for instantiation) and miscellaneous tools (e.g., dials, sliders, guides).

Such items could easily incorporate acoustically-distinct materials, and be made small and pointy, like real pens and pencils. These would be extremely durable and inexpensive to mass produce.

Figure 5A:
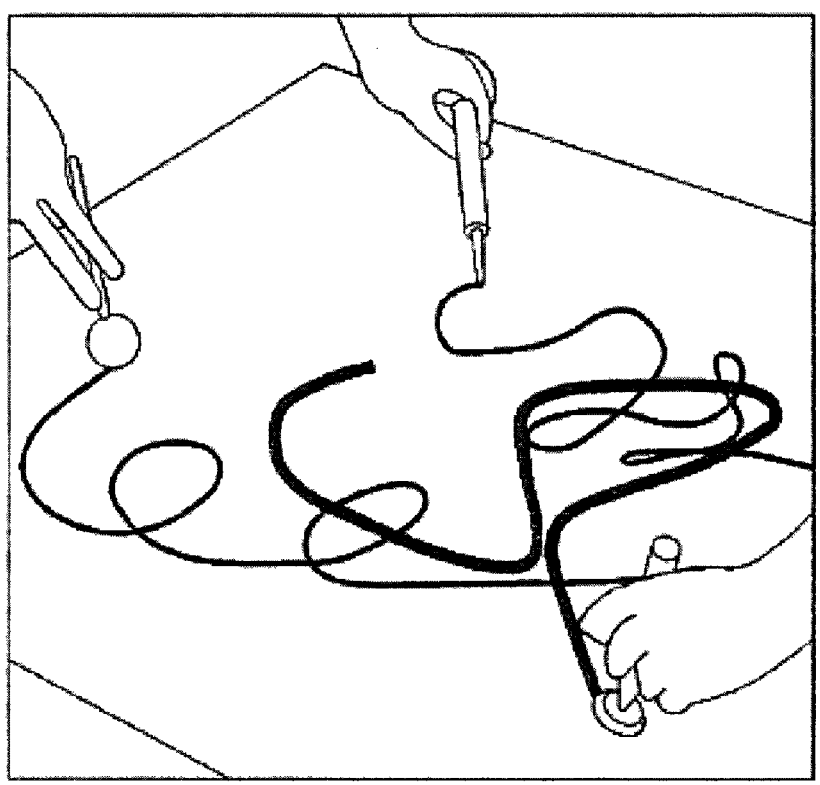
FIG. 5A shows passive tools (i.e., objects requiring no power) representing different "brush" colors, allowing several users to paint simultaneously, without color or mode switching.

Furthermore, for example, painting applications on conventional interactive surfaces typically use a palette-based color mode selection. When a color is chosen, all users are forced to switch to this color. However, as shown in FIG. 5A, the apparatus of the second embodiment allows multiple users to pick up one of several color "brushes" with the six tools shown in FIG. 4 and use them simultaneously. Further, a tool with different materials on each end may be used to draw and then flipped around to erase, like a pencil.

Figure 5B:
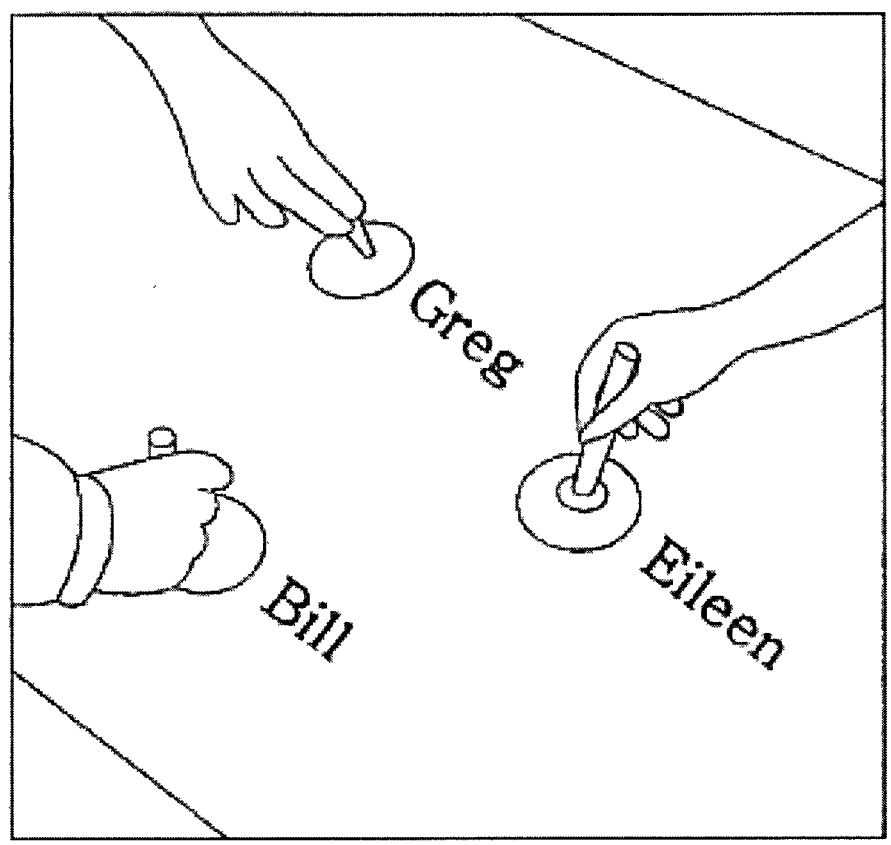
FIG. 5B shows passive pens (i.e., solid materials requiring no power) allowing a touch sensitive surface to identify which user was performing what action.

Another possibility is to assign users uniquely identified input tools. This would allow actions on a system to be attributed to a particular person, e.g., Greg, Bill, or Eileen, as shown in FIG. 5B. This embodiment may also be used for, e.g., collaborative document editing, individualized undo stacks, and read/write permissions.

While the invention has been shown and described with respect to the preferred embodiments, the present invention is not limited thereto. It will be understood by those skilled in the art that various changes and modifications may be made without departing from the scope of the invention as defined in the following claims.

It is claimed:

1. An apparatus for classifying touch events, the apparatus comprising:
    a touch sensitive surface configured to generate a touch event when an object or finger touches the touch sensitive surface, wherein the touch event entails a mechanical vibration generated upon contact with the surface;
    a sampler configured to continuously sample and store mechanical vibration data spanning a period of time from before a touch event to after the touch event;
    a touch event detector configured to detect the onset of the touch event; and
    a touch event classifier configured to classify the touch event to identify the object used for the touch event based on sample mechanical vibration data captured during an entirety of the touch event including a frequency domain center of mass associated with the touch event.

2. The apparatus of claim 1, wherein the touch event classifier comprises:
    a conversion unit configured to convert a mechanical vibration signal into an electrical signal;
    an extraction unit configured to derive a series of features representative of the touch event from the electrical signal; and
    a classification unit configured to classify the touch input using the features to identify the object used for the touch event.

3. The apparatus of claim 2, wherein the acoustic signal is created through the use of a passive tool impacting the touch sensitive surface.

4. The apparatus of claim 1, wherein the mechanical vibration comprises an acoustic signal.

5. The apparatus of claim 1, wherein the touch event detector is embedded in the apparatus to detect the touch event.

6. The apparatus of claim 1, wherein the touch event detector is attached to the touch sensitive surface to detect the touch event.

7. The apparatus of claim 1, wherein the mechanical vibration is created via any one of finger parts including a tip, a pad, a fingernail, and a knuckle.

8. The apparatus of claim 7, wherein each of the finger parts is used to provide a touch based interface.

9. The apparatus of claim 7, wherein each of the finger parts are bound to different user interface actions.

10. The apparatus of claim 1, wherein the sampler comprises a sliding window sampler that stores mechanical vibration data associated with a particular length of time that overwrites old data after the particular length of time with new mechanical vibration data.

11. The apparatus of claim 1, wherein the touch event classifier classifies the touch event based on an average absolute amplitude, a total absolute amplitude, and a standard deviation of absolute amplitude of the touch event.

12. The apparatus of claim 1, wherein the touch event classifier classifies the touch event as a knuckle touch event.

13. The apparatus of claim 1, wherein a user interface is commanded to display a right click menu when the touch event classifier classifies the touch event as a first type of touch event, and wherein an item displayed on the user interface is selected when the touch event classifier classifies the touch event as a second type of touch event.

14. A method for classifying touch events, the method comprising:
    continuously sampling and storing acoustic signal data spanning a period of time from before a touch event to after a touch event in a sampler;
    detecting the touch event, wherein the touch event is made by an object touching or striking a touch sensitive surface and entails an acoustic signal due to impacting the touch sensitive surface;
    deriving a set of features representative of the touch event from the acoustic signal data stored in the sampler captured during an entirety of the touch event, the features including a frequency domain center of mass associated with the touch event; and
    classifying the touch event using the features to identify the object used for the touch event.

15. The method of claim 14, wherein said detecting the touch event comprises capturing a mechanical vibration signal.

16. The method of claim 15, wherein said classification of the touch event comprises:

converting the mechanical vibration signal into an electrical signal;
extracting a series of features representative of the touch event from the electrical signal; and
classifying the touch event using the features to identify the object used for the touch event.

17. The method of claim 14, wherein the mechanical vibration is created via any one of finger parts including a tip, a pad, a fingernail, and a knuckle.

18. The method of claim 17, wherein each of the finger parts is used to provide input to a touch based interface.

19. The method of claim 17, wherein each of the finger parts is used to input different user interface actions.

20. The apparatus of claim 14, wherein the mechanical vibration is created through the use of a passive tool impacting the touch sensitive surface.

* * * * *